Feb. 7, 1961 H. H. MOODY 2,970,876
DIRECTION INDICATOR FOR SEISMIC FIELD SETUPS
Filed June 8, 1959 2 Sheets-Sheet 1

INVENTOR.
HERBERT H. MOODY
BY Joseph C. Kotarski
ATTORNEY

United States Patent Office 2,970,876
Patented Feb. 7, 1961

2,970,876

DIRECTION INDICATOR FOR SEISMIC FIELD SETUPS

Herbert H. Moody, Ponca City, Okla., assignor to Continental Oil Company, Ponca City, Okla., a corporation of Delaware Filed June 8, 1959, Ser. No. 818,893

4 Claims. (Cl. 346—17)

This invention relates generally to improvements in the art of seismic exploration, and more particularly, but not by way of limitation, to an improved method and apparatus for automatically recording the compass bearing of a seismic exploration instrument layout.

As it is well known in the seismic exploration industry, a normal set of field recording equipment basically comprises a recording unit, two cables and associated detectors or seismometers. In a routine field setup the seismometers are placed on the ground in a line several hundred feet long. Each seismometer, or group of seismometers, is connected to one of the cables at a place provided for that purpose on the cable. One end of each cable is connected to the recording unit by means of plug or clip connections. Heretofore, the direction of an instrument layout (the direction along which the seismometers are extended) has always been recorded by hand. Occasional human errors have caused a great deal of expense, inconvenience and embarrassment. For example, on rare occasions, as when local terrain causes the recording unit to be in an abnormal location with respect to the seismometer line, the cables may be easily interchanged. Also, the azimuth, or direction, of the seismometer line is easily confused on cloudy days and/or when working in thicky wooded areas.

The present invention contemplates a novel method and apparatus for recording the compass bearing of the seismometer line on the seismic record provided by the recording unit to minimize the possibility of human error. A housing containing a circular-shaped potentiometer is connected to the outer end of one of the seismometer cables. The housing is then placed on the ground in such a position as to orient the potentiometer in a predetermined direction by use of a compass carried by the housing. A D.C. potential is then applied across the terminals of the potentiometer to provide a constant value D.C. current through the potentiometer. The sliding contact on the potentiometer is then aligned with the seismometer line by use of a suitable pointer on the housing connected to this movable contact, such that the potential between one terminal of the potentiometer and the movable contact is indicative of the compass bearing or direction of the seismometer line. This potential is preferably fed to the recording unit by suitable conductors extending through the respective seismometer cable and applied on one of the recording heads in the recording unit to make a permanent record of the direction along which the seismometer line extends.

An important object of this invention is to minimize the errors involved in interpreting seismic records which are caused by improper determinations of the direction of the field instrument layouts, or by interchanging the seismometer cables in a field setup.

Another object of this invention is to automatically record the compass bearing of a seismic exploration instrument layout on the seismic record when the seismic record is made.

A further object of this invention is to minimize the possibility of mislabeling seismic records.

Another, and more general object of this invention, is to improve the efficiency and reliability of seismic exploration.

A still further object of this invention is to provide a method of recording the compass bearing of a seismic exploration instrument layout which will require a minimum of time and effort by the field personnel, which is inexpensive, and which will materially increase the reliability of the field records.

Other objects and advantages of the invention will be evident from the following detailed description, when read in conjunction with the accompanying drawings which illustrate my invention.

Figure 1:
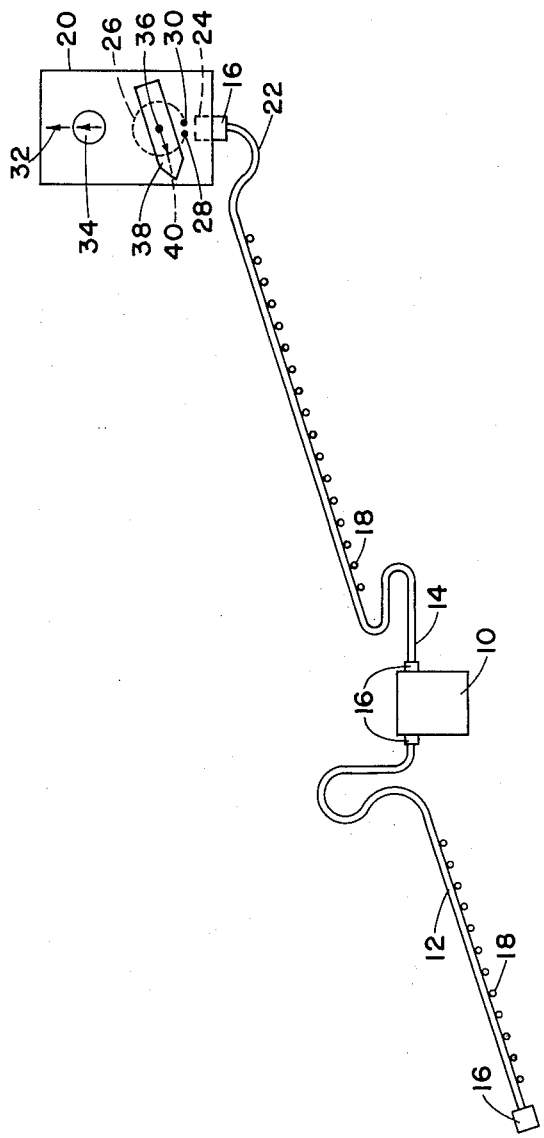
Figure 1 is a schematic illustration of a field layout of seismic recording equipment utilizing the present invention.

Referring to the drawings in detail, and particularly Figure 1, reference character 10 designates a seismic recording unit of any suitable type of multi-channel recorder. Normally, the recording unit 10 will be a magnetic recorder having a large number of channels, such as twenty-four channels. Two seismometer cables 12 and 14 are connected to the opposite sides of the recording unit 10 by suitable plugs or connectors 16 on the respective ends of the cables 12 and 14. Also, each of the cables 12 and 14 has an identical plug 16 on the outer end thereof, such that the cables may be extended from the recording unit 10 in either direction and provide the maximum versatility for the system. It may further be noted that each of the cables 12 and 14 is normally several hundred feet long and the cables are normally extended along a fairly straight line from opposite sides of the recording unit 10.

A plurality of detectors or seismometers 18 are suitably connected to each of the cables 12 and 14 along the length of each cable to receive seismic signals generally along a vertical plane. As it will be understood by those skilled in the art, each of the detectors illustrated in Figure 1 may be either a single detector or a group of detectors suitably connected to the respective cable 12 or 14. In any event, the seismic signal received by each of the detectors 18 is converted to an electrical signal and fed through suitable conductors (not shown) contained in the respective cable 12 or 14 to a recording head in the recording unit 10 to provide a trace on the seismic record made by the recording unit 10.

In accordance with the present invention, a housing 20 is positioned at the outer end 22 of the cable 14 and is provided with a suitable receptacle 24 for connection with the plug 16 on the outer end of the respective cable. A circular type 360 degree linear potentiometer 26 is supported in a fixed position in the housing 20 with the in-put and out-put terminals 28 and 30 thereof aligned with the center of the potentiometer and with an index mark 32 on one end of the top portion of the housing 20. A suitable magnetic compass 34 is also supported in the housing 20 in alignment with the index mark 32 and the center of the potentiometer 26 to facilitate the orientation of the potentiometer 26. In a preferred embodiment of the present invention, the housing 20 is positioned on the ground with the index mark 32 aligned with the needle of the compass 34, such that a plane including the index mark 32, the center of a potentiometer 26 and the terminals 28 and 30 of the potentiometer will extend along the magnetic North and South for the particular area being investigated. It will be understood, however, that regardless of the position of the housing 20, the direction at which the terminals 28 and 30 extend from the center of the potentiometer 26 may be easily determined by visually inspecting the compass 34 and the index mark 32.

A shaft 36 is rotatably supported in the housing 20 to extend vertically and project above the housing in alignment with the center of the potentiometer 26. A suitable pointer 38 is secured on the upper end of the shaft 36 above the housing 20 and is suitably shaped that it may be visually aligned with the seismometer cables 14 and 12, i.e., the seismometer line. The movable contact 40 of the potentiometer 26 is carried by the pointer 38 and is moved around on the potentiometer 26 when the pointer 38 is positioned by being turned on the shaft 36. Thus, the distance around the potentiometer 26 between either of the terminals 28 and 30 and the movable contact 40 is indicative of the direction of the seismometer cables 14 and 12 when the pointer 38 is aligned with these cables.

Figure 2:
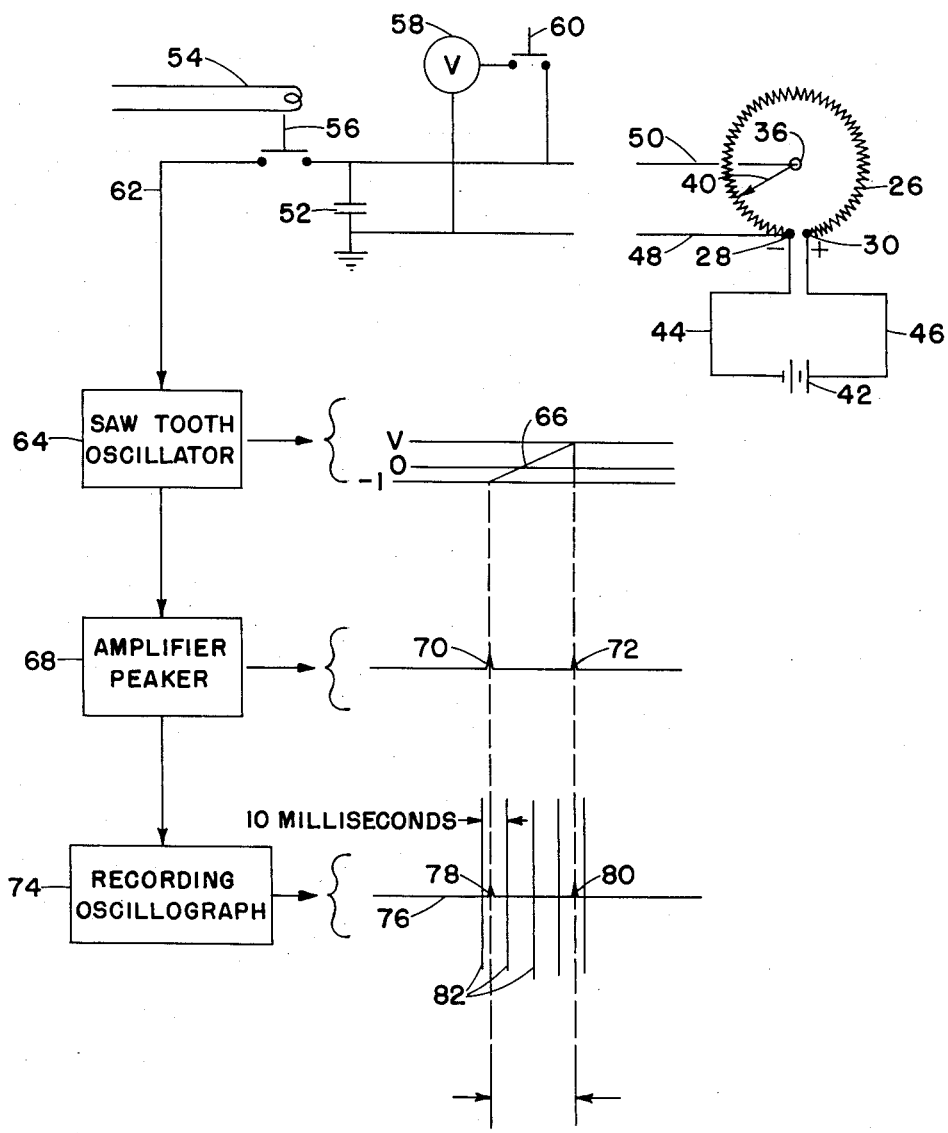
Figure 2 is a schematic wiring diagram illustrating a typical electrical system of the present invention.

As shown in Figure 2, a source 42 of D.C. energy is connected to the terminals 28 and 30 of the potentiometer 26. The source 42 may be in the form of a battery positioned in the housing 20, or it may be positioned in the recording unit 10 and connected to the terminals 28 and 30 by conductors 44 and 46 extending along the length of the respective cable 14. In either event, the source 42 is connected to the terminals 28 and 30 in such a direction that the terminal 28 is made negative, and source 42 is so constructed to pass a D.C. current of constant value through the potentiometer 26.

As also illustrated in Figure 2, conductors 48 and 50 are connected to the terminal 28 and the movable contact 40, respectively, of the potentiometer 26 and are extended through the respective cable 14 to the recording unit 10.

The conductors 48 and 50 are suitably connected across a capacitor 52 in the recording unit 10 for stabilizing purposes, and the negative side of capacitor 52 is grounded in recording unit 10. The potential difference between terminal 28 and the movable contact 40 of the potentiometer 26 is therefore present across capacitor 52 in the recording unit 10. It will be apparent that this potential difference is indicative of the position of movable contact 40, and hence indicative of the direction along which cables 14 and 12 extend. This potential difference may be applied through switch 56 and used in any desired manner to provide the desired indication on the resulting seismic record which will provide a permanent record of the direction along which the cables extend for the particular setup. The indications on the resulting trace of the seismic record made by the recording unit 10 may take any of several forms. For example, a pulse may be used to deflect the trace concerned a certain amount, such as ¼ inch for 90 degrees, ½ inch for 180 degrees, etc. Another method would be to cause a selected number of cycles of a certain frequency (100 cycles per second, for example) to be superimposed on the trace concerned. Each cycle would represent a certain number of degrees. A third method would be to cause two pulses on the trace concerned, the pulses being separated by a length of time proportional to the azimuth or direction of the seismometer line. This last method is ordinarily more accurate, since most seismic records are already furnished with accurate timing line at .01 second intervals. This method is described in more detail in the next paragraph.

The potential between the terminal 28 and the movable contact 40 is preferably applied to the recording assembly at the proper time to cause the indications which designate the azimuth, or direction, of the seismometer line to be on the early portion of the seismic record. Therefore, the firing circuit 54 is suitably connected to a relay switch 56 interposed in conductor 62 to close the circuit from movable contact 40 to the apparatus which converts the electrical potential difference to a proportionate interval of time. When the firing circuit 54 is energized, causing switch 56 to close, the potential across capacitor 52, which is furnished by movable contact 40, is applied through proper control circuitry to initiate a single cycle signal from a sawtooth oscillator 64, the action of which is well known to persons familiar with the art. The maximum amplitude, and hence the time duration, of the sawtooth signal 66, is to be controlled by the potential applied from capacitor 52, which was furnished by movable contact 40. In order to insure definite indications when the azimuth of the seismometer line is near zero, and the resultant potential furnished by movable contact 40 is near zero, the sawtooth oscillator 64 should operate from a point which is slightly negative with respect to ground for the remainder of the system. On the sketch this point is shown as −1. Under these conditions if the potential furnished by movable contact 40 were zero, the sawtooth oscillator 64 would deliver an output signal with a peak amplitude of zero (labeled 0 on the sketch). The system could be adjusted so the time interval, or duration of the cycle, would be ten milliseconds, or any other desired interval, to represent an azimuth of zero. The ten milliseconds, or other interval representing zero azimuth, would then be subtracted from the resultant time interval before computation of the azimuth of the seismometer line.

The output of sawtooth oscillator 64 is applied to a peaker-amplifier 68, which delivers pulses shown as 70 and 72 to the recording oscillograph. Pulse 70 is developed at the start of the sawtooth cycle, and pulse 72 is at the completion of the cycle, and the duration of each is about two milliseconds. Pulses 70 and 72 are applied to the recording oscillograph 74, where they are recorded on the desired trace on the seismic record as pulses 78 and 80. Since the seismic record is furnished with accurate timing lines 82 at ten millisecond intervals, the time interval between the pulses is easily determined. By proper adjustment and calibration of the system, the azimuth, or direction of the cable and seismometer line could be quickly and easily determined from the record. For instance, one millisecond could be made to represent two degrees of azimuth. As shown on the sketch, an interval of 33 milliseconds minus the 10 milliseconds which indicates an azimuth of zero, would leave an interval of 23 milliseconds, representing an azimuth of 46 degrees. It is also desirable to check the operation of the direction indicating apparatus prior to energizing the recording unit 10. I therefore connect a suitable voltmeter 58 between the conductors 48 and 50 at the recording unit 10, and a suitable push button switch 60 is furnished to complete the meter circuit. It will thus be apparent that when the push button switch 60 is closed, the voltmeter 58 will indicate the setting of the pointer 38 on the housing 20 and provide a check of this direction indication. As it will be understood, the voltmeter 58 may be easily calibrated to read directly in degrees, if desired.

From the foregoing it will be apparent that the present invention provides a novel method and apparatus for automatically recording the direction or azimuth of an instrument layout for a seismic field setup, and this record of the azimuth will provide on the final seismic record a means to prevent any misinterpretation of the record at a later date. The potentiometer is directly connected to the seismic recording unit and may be easily oriented at one end of the seismometer line, such that when the pointer is visually aligned with the seismometer line, the direction at which the pointer is extended will be automatically recorded by the recording unit. The potentiometer is easily oriented by the operator positioning the housing containing the potentiometer in accordance with the magnetic compass to provide accurate results. It will also be understood that the present apparatus and method could be used to indicate the true azimuth of the seismometer line by merely orienting the potentiometer while allowing for local magnetic declination. Furthermore, it will be apparent that the present method may be easily performed by the field personnel; requires simple and inexpensive equipment, and will greatly minimize the possibility of human error.

Changes may be made in the combination and arrangement of parts or elements, as well as steps and procedures, heretofore set forth in the specification and shown in the drawings, it being understood that changes may be made in the embodiments disclosed without departing from the spirit and scope of the invention as defined in the following claims. For example, a potentiometer and associated apparatus may be provided at each end of a seismometer line, either to provide a double check on the direction indication, or in the event one of the seismometer cables is extended at an angle from the recording unit different from the other seismometer cable. Also, the potentiometer and associated apparatus may be connected to the outer end of either of the seismometer cables to provide the maximum versatility and arrangement of the apparatus for convenience in arranging subsequent instrument layouts.

I claim:

1. In a seismic field recording system including a recorder and a seismometer cable connected at one end thereof to the recorder and extended along a line from the recorder, the improvement which comprises a housing for positioning at the other end of the cable, a circular type potentiometer having an in-put and an out-put terminal and secured in a fixed position in the housing, a compass carried by the housing for guiding the positioning of the housing and orientation of the potentiometer, means for applying a D.C. potential to the terminals of the potentiometer and passing a constant value D.C. current through the potentiometer, a pointer carried by the housing for visual alignment with the seismometer cable line, a movable contact carried by the pointer in sliding contact with the potentiometer, and conductors extending from the recorder through the cable into connection with one terminal of the potentiometer and said movable contact for recording the potential across said one terminal and said contact which is indicative of the orientation of the seismometer cable line.

2. A system as defined in claim 1 wherein the potentiometer is a 360 degree linear potentiometer, and characterized further to include an index mark on the housing aligned with the terminal of the potentiometer and the center of the compass to facilitate the orientation of the potentiometer.

3. A system as defined in claim 2 wherein the terminal of the potentiometer at the counterclockwise end of the potentiometer is connected to the negative side of the D.C. supply to the potentiometer, and said conductors are connected to said contact and the terminal at the counterclockwise end of the potentiometer.

4. A system as defined in claim 1 characterized further in that said recorder includes a firing circuit, and said firing circuit is connected to one of said conductors for imposing said potential between one terminal of the potentiometer and said contact on the recorder upon energizing of the firing circuit.

References Cited in the file of this patent

UNITED STATES PATENTS

| | | |
|---|---|---|
| 1,890,607 | Hite | Dec. 13, 1932 |
| 2,178,306 | Lauck | Oct. 31, 1939 |
| 2,330,661 | Arey et al. | Sept. 28, 1947 |
| 2,513,314 | Hawkins | July 4, 1950 |
| 2,632,959 | Boucher | Mar. 31, 1953 |
| 2,814,546 | Nickel | Nov. 26, 1957 |